United States Patent Office 3,349,305
Patented Oct. 24, 1967

3,349,305
ELECTROMECHANICAL OSCILLATORS
Jacques Jean Gustave Dietsch, Paris, France, assignor to Societe Anonyme des Etablissements Leon Hatot, Paris, France, a company of France
Filed June 2, 1964, Ser. No. 371,956
Claims priority, application France, June 12, 1963, 937,764
10 Claims. (Cl. 318—128)

This invention relates to electromechanical oscillators and may find various applications, for example in chronometry to generate periodic signals or as a driving means for a timing device.

Many forms of electromechanical oscillators have been proposed in the past, starting with the tuning fork oscillator.

An object of the present invention is to provide a vibrator which does not require a rigid support and which will operate independently of its position and surroundings.

According to the present invention an electromechanical oscillator includes a flexible vibrator comprising a thin elastic wall in the form of a surface of revolution about an axis, a fixed support, resilient connecting means connecting the vibrator to the support, and electrically energised driving means acting on the vibrator at at least one pair of points lying in a plane containing the axis, for maintaining the vibrator in a state of sustained vibration by applying to it a pair of equal and opposite oscillating forces. The driving means may be arranged to apply to the vibrator two pairs of forces at points in two planes containing the axis and inclined to each other at right angles.

In one form of the invention the connecting means comprises springs, for example coil springs or blade springs. The connecting means may be connected to the vibrator at points symmetrically positioned with respect to the points acted on by the driving means, for example points coincident with them or points mid-way between them.

In another form of the invention the oscillator includes a bell in the form of an elongated hollow surface of revolution of which one end is open and forms the vibrator while the other end forms the support and the remainder of the cylindrical wall forms the connecting means. The thin resilient wall may be cylindrical or conical or part-spherical provided that it is a body of revolution.

The driving means may include a stationary exciting coil unit co-operating with magnetic means carried by the vibrator. The coil unit, which may be mounted coaxially with the vibrator, conveniently includes two coils coupled to function as a transformer in a semi-conductor oscillator.

In one application of the invention the oscillator is combined with a rotor mounted coaxially with the vibrator and adapted to rotate in synchronism with it. Thus the rotor may incorporate a multi-pole circular magnet or a phonic wheel, while the vibrator includes magnetic elements synchronously co-operating with it. The magnetic elements may serve to drive the rotor as a synchronous motor or alternatively the rotor may be secured to that of a separate electric motor, for example a D.C. motor, to stabilise its speed.

Further details and features of the invention will be apparent from the following description of certain specific embodiments, given by way of example, with reference to the accompanying drawings, in which:

FIGURES 1, 1*a* and 1*b* diagrammatically show a vibrator according to the invention in the normal state and in the two extreme vibration positions, respectively, the vibration being produced by two diametrically opposite forces;

FIGURES 2, 2*a* and 2*b* are views similar to FIGURES 1, 1*a*, and 1*b* of an arrangement in which two pairs of diametrically opposite forces disposed in two planes perpendicular to one another are applied to the vibrator;

Figure 5A:
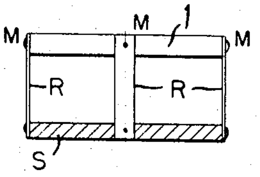
Figure 6A:
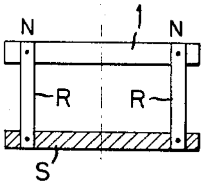
Figure 5B:
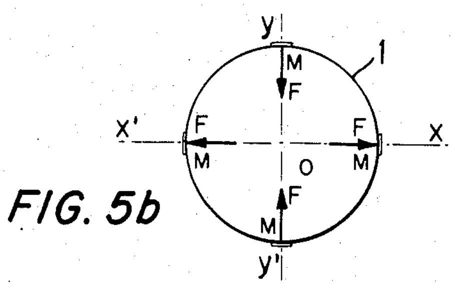
Figure 6B:
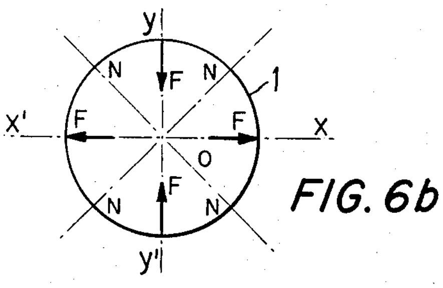
Figure 7A:
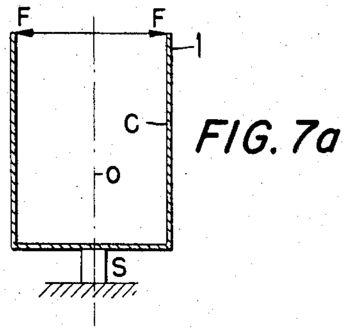
Figure 9A:
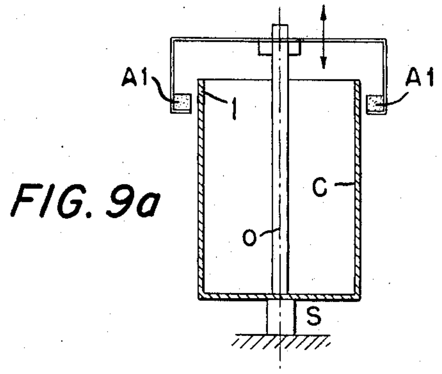
Figure 7B:
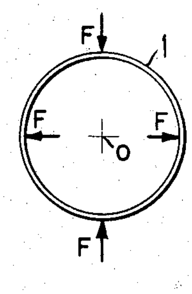
Figure 9B:
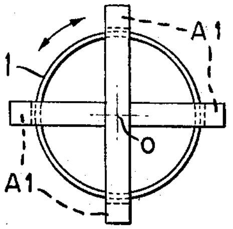
Figure 8A:
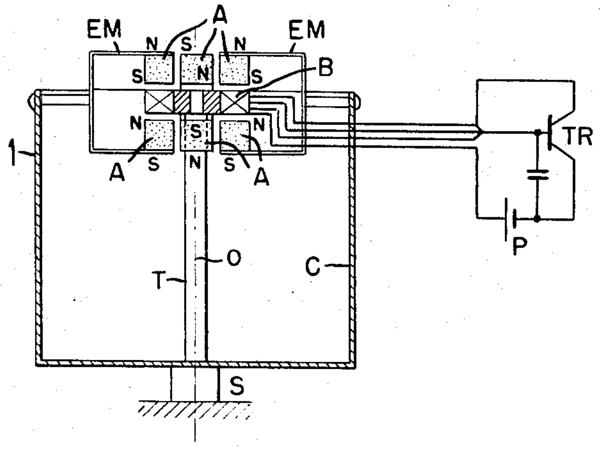
Figure 8B:
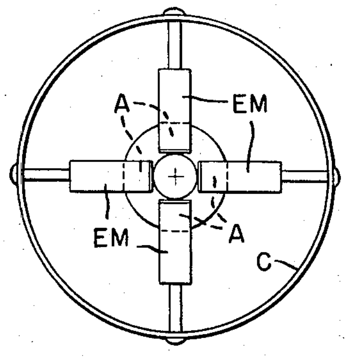
Figure 10A:
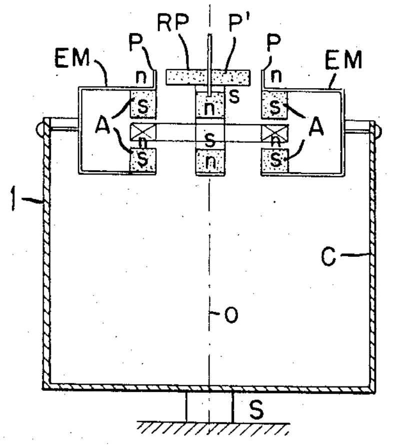
Figure 10B:
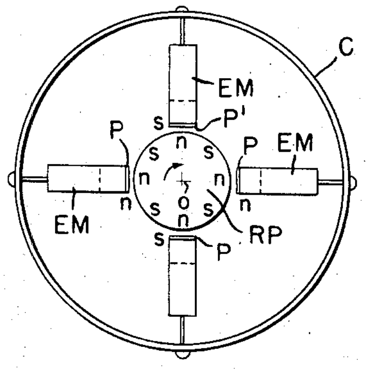
Figure 11A:
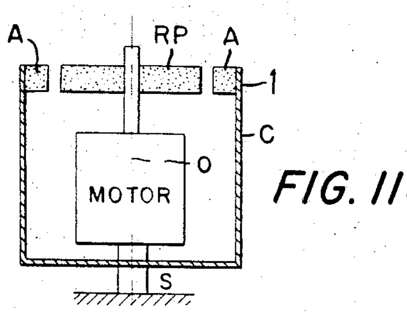
Figure 12:
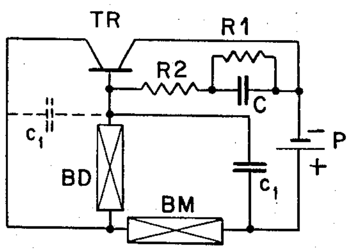
Figure 11B:
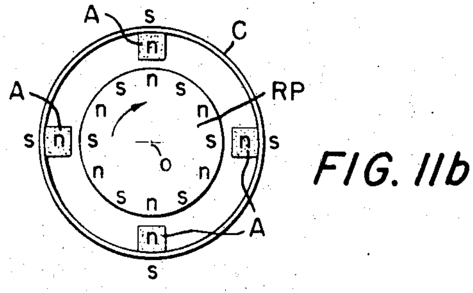

FIGURES 5*a* and 5*b* are a side view and plan view, respectively, of a further way of mounting the vibrator;

FIGURES 6*a* and 6*b* are a side elevation and plan view, respectively of a further way of mounting the vibrator;

FIGURES 7*a* and 7*b* are views, in axial section and plan, respectively, of an alternative wherein the resilient connection is provided by a closed surface of revolution of which the vibrator forms the free edge;

FIGURES 8*a* and 8*b* are views similar to FIGURES 7*a* and 7*b* and also show electromagnetic devices for maintaining the oscillations—i.e. they show the complete oscillator;

FIGURES 9*a* and 9*b* are views similar to FIGURES 7*a* and 7*b* but also show an attachment for controlling the oscillation frequency;

FIGURES 10*a* and 10*b* are similar to FIGURES 7*a* and 7*b* and also show a device for converting the oscillatory motion of the vibrator into a uniform rotation;

FIGURES 11*a* and 11*b* are views, in axial section and in plan, respectively, showing the vibrator according to the invention being used to stabilise the speed of a motor, and FIGURE 12 is a circuit diagram of a circuit enabling oscillators according to the invention to be self-starting.

Figure 1:
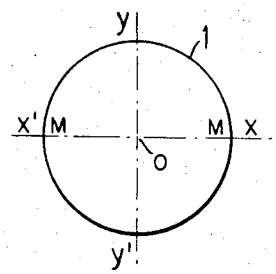
Figure 1A:
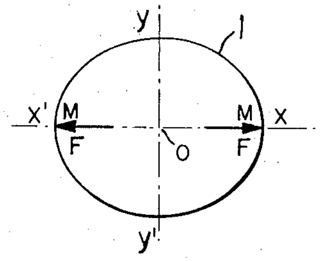
Figure 1B:
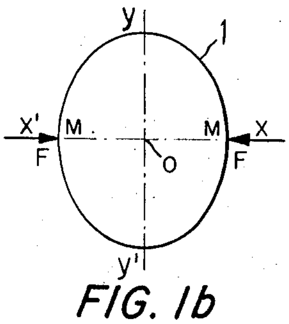

FIGURES 1, 1*a* and 1*b* show the underlying idea of the invention. Vibrators of oscillator systems according to the invention are in the form of a thin resilient surface of revolution about an axis *o*. In the simplest case shown, the surface is formed by a circular strip 1 which can be of any radial section but is preferably of rectangular radial section and which is prepared from a resilient substance whose coefficient of elasticity preferably varies little with temperature. Acting upon the vibrator 1 are at least two equal and opposite oscillating forces F which act along a diameter through the axis *o* and which keep the vibrator 1 oscillating between two extreme positions shown, the one in FIGURE 1*a* and the other in FIGURE 1*b*.

The two forces F are applied to the vibrator 1 at diametrically opposite points M; the two forces F act along a single diameter but in opposite directions so that the initially circular shape of the strip becomes substantially an ellipsoid. The forces F applied to the positions M are periodic and the electromagnetic devices for producing them are such that the frequency of the forces F is the same as the natural oscillation frequency of the strip forming the simplest embodiment of the vibrator according to the invention. The circular strip therefore vibrates by undergoing a substantially elliptical deformation whose axes of symmetry X′ X and Y′ Y are disposed one in the diametral plane containing the direction of the forces F and the other in the diametral plane perpendicular thereto through the centroid of the section of the strip in each plane.

Figure 2:
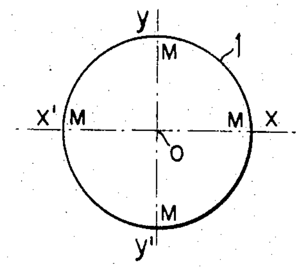
Figure 2A:
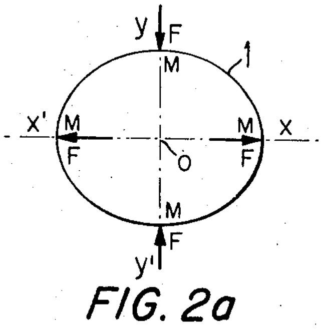
Figure 2B:
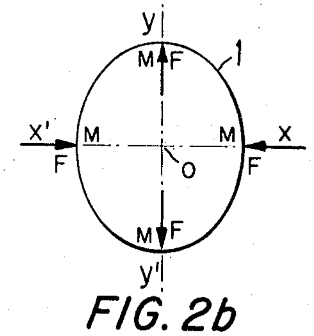

In the embodiment shown in FIGURES 2, 2*a* and 2*b*, four oscillating forces F which are in symmetrical pairs, and which preferably have the same maximum amplitude, are applied to the strip in directions which extend in diametral planes perpendicular to one another along the axes X—X and Y—Y. Preferably, the forces F corresponding to each of the two directions X—X and Y—Y co-operate to deform the strip 1 to an elliptical shape—i.e., when the pair of forces along one diameter tends to increase the corresponding diameter of the strip, the pair of forces along the other diameter tends to reduce the corresponding strip diameter, and so increase the first diameter.

Figure 3:
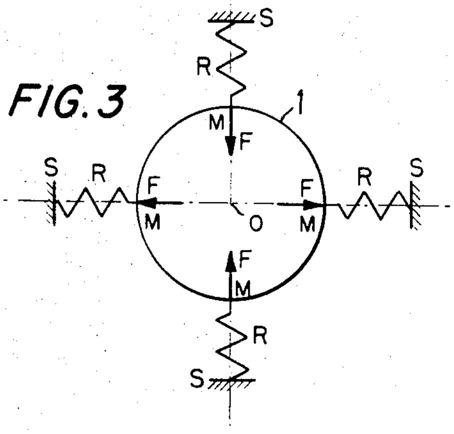
FIGURE 3 shows one way of mounting the vibrator.
Figure 4:
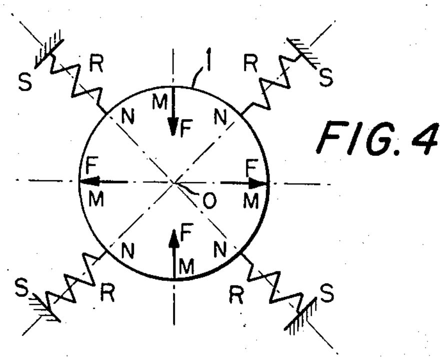
FIGURE 4 shows a second way of mounting the vibrator.

FIGURES 3 and 4 diagrammatically show two possible ways of mounting the vibrating strip resiliently on a fixed bearing member. In both cases the circular strip is resiliently retained in relation to a fixed bearing member S through the agency of four coil springs R. The positions where the springs R are secured to the strip can coincide with the points of application of the forces M, as shown in FIGURE 3. Another advantageous arrangement is to secure coil springs R at positions N disposed mid-way between consecutive positions M, as shown in FIGURE 4. The springs R are shown diagrammatically in FIGURES 3 and 4 as helical springs but can, with advantage, be replaced by spring strips, as shown in FIGURES *5a, 5b* and *6a, 6b*. These springs are sufficient to maintain the circular strip without their reactions introducing appreciable disturbances.

Referring to FIGURES *5a* and *5b*, the suspension strips disposed at the positions M are so arranged that their direction of maximum flexibility extends in the direction of the forces F.

In FIGURES *6a* and *6b*, on the other hand, the suspension strips disposed mid-way between consecutive positions M are arranged perpendicularly to the circular vibrating strip, for the movements of the points N when the circular strip distorts are substantially rectilinear and along tangents to the points N.

It is also possible to use other forms of resilient connection, more particularly magnetic suspensions using the repulsion between permanent magnets.

In the embodiments shown in FIGURES *7a* and *7b*, the resilient connection is formed by a surface of revolution around the axis *o*. There is provided a bell C whose free edge forms the vibrator 1 while the base is secured to the fixed bearing member. The bell C can have any shape of revolution around the axis *o*, for instance the cylindrical shape shown. The bell C can also be uniformly perforated, i.e. not solid, and the embodiment provided by a bell formed with four perforations at 90° intervals corresponds to the embodiments shown in FIGURES *5a, 5b, 6a* and *6b*. As in the previous embodiments, either two, or preferably four, periodic forces F are applied to the edge 1 of the bell C. These four forces are applied along diameters perpendicular to one another and their respective directions are exactly as described above for the circular strip, so that if two forces along one diameter tend to reduce the same, the other two forces F operative along the other diameter tend to increase the diameter in line with them.

FIGURES *8a* and *8b* show a bell C having an electromagnetic system for oscillating its free edge. Four electromagnetic systems EM are arranged at 90° intervals round the free edge 1 of the bell C. Each takes the form of a U-shaped soft-iron member, the ends of the U bearing permanent magnets A which are preferably made of a high-coercivity material and whose polarities are such that the magnetic fields pass through the U-shaped soft-iron members. The magnetic fields in the air gaps between the magnets are in the same direction in respect of any two systems EM on a single diameter and, in respect of the two systems EM arranged along the diameter perpendicular to the first diameter, are in the same direction as each other but are opposite to those of the first-mentioned two systems.

A flat circular coil unit B whose center coincides with the center of the circle formed by the free edge 1 of the bell C extends through the air gaps of the four magnetic systems EM. The coil unit B is formed by two windings BD and BM respectively connected in the control and load circuits of a transistor TR in the manner disclosed by French patent specification 1,092,411 and Patent 3,168,690. The winding is supported at its center on a rod T. When the free edge 1 of the bell C distorts along the two diameters associated with the systems EM, the voltages induced in the control winding BD by the four magnetic fields add together, and the four magnetomotive forces produced by the flow of current in the drive winding BM co-operate to produce the desired effect.

This arrangement of the electromagnetic elements is very advantageous and makes the system very efficient since the windings are used over much of their length. Also, the system is astatic since the directions of the magnetic fields are opposed by pairs. The arrangement is therefore unaffected by external magnetic fields. The oscillation frequency of this vibrator depends upon the nature, thickness and depth of the material used for the bell C and can be from 30 to 1000 c./s., although higher frequencies are possible.

Various means for adjusting or changing the oscillator frequency may be provided, more particularly magnetic means which act either on the assembly of magnetic systems or, if the bell is made of a ferromagnetic metal, by producing forces of attraction between the free edges and auxiliary magnets.

An example is shown in FIGURES *9a* and *9b*, in which four magnets $A_1$ are so arranged on a cruciform bearing member that their effects are operative along two diameters perpendicular to one another. Since the bell C is made of a ferromagnetic metal, the assembly of magnets $A_1$ produces magnetic fields which end to return via the ferromagnetic metal of the bell C. The attractions produced by these magnets on the edges of the member C enable the oscillation frequency thereof to be varied according to whether the magnets $A_1$ are positioned on the two diameters either at the places where the forces are applied or at positions offset by 45° from such diameters. A further variation can be provided by varying the position of the magnets $A_1$ in relation to the height of the bell C. Two possible variations are therefore provided, one being given by rotation around the axis of the bell C and the other being given by an upwards displacement parallel to the axis. Mechanical control means, in the form of the addition of weights to the free edge of the bell C, can also be used. The weights can be so moved along the free edge as to vary the moment of inertia of the system and therefore to vary the frequency.

The arrangements described above can be used as time bases delivering periodic pulses at the oscillation frequency of the device. Secondary electronic circuits, preferably comprising transistors or semi-conductor elements, can amplify, shape, divide or otherwise act on the pulses to suit different requirements, for instance to provide controlled-frequency distributors for controlling synchronous motors or the use of the devices as an emergency unit in the event of an A.C. mains failure.

If the oscillation-producing electromagnetic circuit is varied and studied, the oscillating devices according to the invention can also be used as variable-frequency generators, for by variation of the phase relationship between the current pulses applied to the magnetic circuits disposed on any single diameter, the oscillation frequency can be varied within very wide limits in accordance with the amount of phase difference. This feature is very useful in cases where a variable-frequency generator is required, as in time-base systems for sweeping cathode ray oscilloscopes.

FIGURES *10a* and *10b* diagrammatically show an oscillator according to the invention combined with means for converting the oscillating motion into a uniform circular motion, more particularly for transmitting the motion to the hands of a clock or similar device. The movements of the magnets A are used to act either on a multi-pole magnet or on a phonic wheel which is disposed very near the magnets A and which is so devised that the magnetic field variations produced by the movements of the magnets A have an effect similar to the effect of an A.C. flowing through the winding of a synchronous motor. To this end, soft-iron members are arranged to form pole pieces P, P', for instance above the magnets A of the top part of the magnetic devices EM. The pole pieces on any one diameter have the same polarity, and the pole pieces on the diameter perpendicular to the diameter just mentioned have polarities opposite to the other pole pieces. A magnetic rotor in the form of a multi-pole magnet or a phonic wheel RP, is disposed between the pole pieces with its axis coinciding with the axis of the bell C. Preferably, the number of poles of the rotor RP is 4 $p$, $p$ being an even number. Of course, the diameter of the rotor RP is slightly less than the distance between two diametrically opposite pole pieces. Consequently, the rotor RP performs a uniform circular movement when the oscillator is excited.

The explanation of this is readily understandable. It will be assumed that the rotor RP is initially in the position shown in FIGURE 10*b*. If the pole pieces *n* move towards the rotor RP, the pole pieces *s* move away from it. The pole pieces *n* increasingly repel the nearby poles *n* of the rotor RP whereas the pole pieces *s* have a decreasing attraction on the other poles *n* of the rotor. Consequently, the rotor RP tends to rotate and its poles *s* tend to move towards the poles *n* of the pole pieces. The latter then move away from the rotor RP whereas the pole pieces *s* move towards it, and since the rotor RP has turned through one pole "pitch" there is a further repulsion between the pole pieces *s* and the poles *s* of RP, and there is a magnetic attraction between the pole pieces *s* and the pole *n* of the rotor, so that there is a further rotation of the rotor.

The magnet or phonic wheel RP has some inertia which can be increased by the provision of a flywheel on its spindle so that it rotates uniformly at a speed controlled by the frequency of the oscillations of the north and south pole pieces. If required, reduction gearing (not shown) can be provided to drive hands to show the time. The speed of rotation of the rotor depends upon its pole number and upon the frequency of the oscillations.

The device described may be modified in various ways without departing from the invention. In particular extra magnets may be added, for instance, on the free edge of the bell C, in co-operation with a phonic wheel or multiple magnet RP which has a very large number of poles. This is a direct way of enabling the rotor to rotate very slowly. Also, the feature of moving the force application places or places disposed at 45° thereto can be used to operate known mechanical elements for converting the oscillating movements into rotary movements (pawls and ratchets and so on).

Another use of oscillating devices according to the invention, preferably energised via a transistor, is to stabilise and control the speed of rotation of a D.C. micromotor. Such a device is shown in FIGURES 11*a* and 11*b*. A micromotor M*ot* drives a multiple magnet or a phonic wheel RP rigidly secured to the motor spindle. This assembly can be placed inside the bell C. Magnets A secured to the free edge of the bell C and disposed on two diameters perpendicular to one another so co-operate with the rotor RP that the magnetic effect produced by the nearness of RP to the magnets A have opposite effects along the two diameters. For instance, in FIGURE 11*b*, a consideration of the respective polarities of the magnetic poles visible will show that there is attraction along the "horizontal" diameter and repulsion along the "vertical" diameter. If the rotor RP is rotated through one pole pitch these magnetic effects are reversed. When the motor rotates and runs up to speed, driving the magnet or phonic wheel RP as it does so, there comes a time when the frequency of the effects of magnetic repulsion and attraction between the magnets A and RP corresponds to the natural oscillation frequency of the free edge of the bell C. The resulting deformations have the same effect as a magnetic escapement, with a tendency for the speed of the rotor RP, and therefore the speed of the motor rotor, to become stabilised. The magnetic effect when the speed of rotation makes the oscillator resonate is very powerful because of the double attraction and repulsion effect of the four magnets A on the poles of the element RP.

Without departing from the scope of the invention, other embodiments are possible, more particularly by improved magnetic effects based on using closed circuits.

FIGURE 12 shows a circuit diagram of a circuit designed to make the oscillators self-starting immediately upon energisation. As in the drive circuits described in the aforesaid French patent specifications, a trigger winding BD is connected in the base-emitter circuit of a transistor TR, and a drive winding BM is connected in series with a supply source in the emitter-collector circuit of the same transistor. To make the oscillating system self-starting, a resistance $R_2$ in series with a capacitor C shunted by a resistor $R_1$ is connected between the base of the transistor TR and the negative side of the supply source P. At switch-on the capacitor C charges up through the resistor $R_2$ so that an emitter-base current flows, the transistor becomes highly conductive and therefore has a high amplification factor. The current flowing through the drive winding BM has had an electromagnetic effect on the oscillation and has led to the trigger winding BD having induced in it a voltage which is amplified by the transistor TR and increases the electromagnetic effect. This first oscillation is enough to start the oscillator. After a time which is determined by the time constants of the capacitor C and of the resistors $R_1$ and $R_2$, the capacitor C is fully charged and the system operates with an on/off switching action, the voltages which are induced in the trigger winding BD making the transistor conductive and allowing a periodic driving current to flow through the drive winding BM.

A capacitor $C_1$ is disposed either between the base and the positive side of the source P or between the base and the emitter in order to damp oscillation produced by the inductive coupling between the two windings BD and BM. When the supply is switched off, the capacitor C discharges through the resistor $R_1$ and the system is ready for further operation.

Various improvements can be made to these devices, more particularly by the use, for the circular strips or for the bell members, of special metals of the Elinvar type whose coefficient of elasticity varies very little with temperature. Magnetic circuits using orientated magnets of very good quality, such as Ticonal 1500 or Ticonal 2000, help to reduce very considerably the power required to maintain the oscillation, and thus enable the device to operate from small self-contained power packs for a very long time.

What is claimed is:

1. A motor comprising, a mechanical vibratory element having a deformable thin wall having a configuration generated by revolution of a surface about a longitudinal axis of said vibratory element, electromagnetic means to render said wall vibratory and sustain said wall in vibration defining two configurations in cross section about a mean configuration relative to said axis, a rotor mounted to rotate about said axis rotatably driven at a given speed in response to vibrations of said vibratory element, and means cooperative with said vibratory element in at least defining the speed of said rotor during vibration of said vibratory element.

2. A motor according to claim 1, in which said means cooperative with said vibrating element is disposed free of said rotor and cooperate with said wall in driving said rotor.

3. A motor according to claim 1, in which said means cooperative with said vibratory element comprises a plurality of spaced pole pieces, said rotor having poles of alternate polarity cooperative with said pole pieces and effective to rotate said rotor during vibration of said vibratory element.

4. Electromechanical oscillator comprising, a flexible vibrator having a thin resiliently deformable wall of circular means cross section about an axis; two pairs of magnetic systems respectively fixed to said wall about two perpendicular planes containing said axis, means in said magnetic systems creating locally magnetic fields, the fields created by one of said pairs being substantially directed towards one point of said axis, the fields created by the other of said pairs being substantially directed away from said point; and energizing means cooperative with said magnetic systems to render said wall vibratory and to sustain it in vibration between two ellipsoidal shapes in cross section.

5. Electromechanical oscillator according to claim 4, in which said means in said magnetic systems creating said magnetic fields comprises means creating said fields of said one pair parallel to said axis in one direction and means creating said fields by said other pairs parallel to said axis and directed in a direction opposite to said one direction.

6. Electromechanical oscillator according to claim 4, in which said energizing means comprises, a transistor, a load circuit and a control circuit connected to said transistor, a motor winding common to said systems connected to said load circuit, a control winding common to said systems connected to said control circuit, said windings being mounted coaxially about axis to intercept said magnetic fields.

7. Electromechanical oscillator according to claim 4, in which said means in said magnetic systems creating said magnetic fields comprises means creating a field of said one pair directed toward said axis, and means creating a field of said other pair directed away from said axis.

8. Electromechanical oscillator according to claim 7, in which said energizing means comprises a rotor having angularly spaced alternately north and south magnetic poles on a periphery thereof.

9. Electromechanical oscillator according to claim 4, in which said means in said magnetic systems creating said magnetic fields comprises means for creating said fields of equal intensity.

10. A motor arrangement comprising, an electromechanical oscillator comprising a flexible vibrator having a thin, resiliently deformable wall of circular means cross section about an axis, two pairs of magnetic systems respectively fixed to said wall about two perpendicular planes containing said axis, means in said magnetic system creating locally magnetic fields, the fields created by the systems of one of said pairs being substantially directed towards one point of said axis, the fields created by the other of said pairs being substantially directed away from said point, energizing means cooperative with said magnetic systems to render said wall vibratory and to sustain it in vibration between two ellipsoidal shapes in cross section, a multiple rotor mounted inside said wall of said oscillator coaxial therewith and cooperative with said magnetic systems for driving therefrom.

References Cited

UNITED STATES PATENTS

| | | | |
|---|---|---|---|
| 694,778 | 3/1902 | Perret | 58—23 |
| 1,907,531 | 5/1933 | Fitzgerald et al. | 58—23 |
| 2,504,719 | 4/1950 | Neilson | 310—25 |
| 2,594,749 | 4/1152 | Ehrat et al. | 331—15 X |
| 2,662,205 | 12/1953 | Virkus et al. | 58—23 |
| 3,075,100 | 1/1963 | Efromson | 310—17 |
| 3,170,278 | 2/1965 | Stutz | 58—23 |

MILTON O. HIRSHFIELD, *Primary Examiner.*

D. F. DUGGAN, *Assistant Examiner.*